(12) United States Patent
Yang et al.

(10) Patent No.: US 12,021,920 B2
(45) Date of Patent: Jun. 25, 2024

(54) FILE REPAIR METHOD AND FILE REPAIR DEVICE FOR USER EQUIPMENT

(71) Applicant: SAMSUNG ELECTRONICS CO., LTD., Suwon-si (KR)

(72) Inventors: Zhenxin Yang, Xi'an (CN); Chunmiao Jiang, Xi'an (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/818,765

(22) Filed: Aug. 10, 2022

(65) Prior Publication Data

US 2023/0199058 A1 Jun. 22, 2023

(30) Foreign Application Priority Data

Dec. 21, 2021 (CN) .......................... 202111570594.6

(51) Int. Cl.
*H04L 67/06* (2022.01)
*G06F 11/14* (2006.01)
*H04L 65/611* (2022.01)
*H04L 67/141* (2022.01)

(52) U.S. Cl.
CPC .......... *H04L 67/06* (2013.01); *G06F 11/1435* (2013.01); *H04L 65/611* (2022.05); *H04L 67/141* (2013.01)

(58) Field of Classification Search
CPC ..... H04L 67/06; H04L 65/611; H04L 67/141; G06F 11/1435
See application file for complete search history.

(56) References Cited

U.S. PATENT DOCUMENTS

| | | | | |
|---|---|---|---|---|
| 8,144,735 | B2 * | 3/2012 | Vayanos | ............... H04W 48/12 370/312 |
| 8,296,436 | B2 | 10/2012 | Curcio et al. | |
| 8,472,365 | B2 * | 6/2013 | Liu | ....................... H04L 1/1664 370/312 |
| 8,588,077 | B2 | 11/2013 | Oran | |
| 8,711,854 | B2 | 4/2014 | Oran et al. | |

(Continued)

FOREIGN PATENT DOCUMENTS

| | | |
|---|---|---|
| CN | 102571264 | 7/2012 |
| CN | 104782078 | 7/2015 |
| KR | 10-2013-0005228 | 1/2013 |

OTHER PUBLICATIONS

3GPP TS 26.346 version 16.5.1 Release 16 (Oct. 2020).

*Primary Examiner* — Sm A Rahman
(74) *Attorney, Agent, or Firm* — F. CHAU & ASSOCIATES, LLC

(57) ABSTRACT

In a file repair method for a user equipment (UE), the UE receives a target file multicasted by a network side in a file download transmission (FDT) manner. The method includes transmitting, by the UE, a multicast attempt repair request for the target file to the network side in a first time period after determining that the target file needs to be repaired, where the first time period does not exceed a time period of a Back-off time of a current session, receiving, by the UE, a feedback message transmitted by the network side, where the feedback message instructs the UE to perform multicast repair, and performing, by the UE, the multicast repair on the target file in response to the received feedback message.

19 Claims, 4 Drawing Sheets

(56) References Cited

U.S. PATENT DOCUMENTS

| | | |
|---|---|---|
| 8,780,907 B2 | 7/2014 | Kotecha |
| 10,095,575 B2 | 10/2018 | Ling et al. |
| 10,516,502 B2 * | 12/2019 | Cao .................... H04L 12/1868 |
| 2014/0010090 A1 * | 1/2014 | Xiao .................... H04L 1/0035 |
| | | 370/242 |
| 2018/0310166 A1 | 10/2018 | Gupta et al. |
| 2020/0404704 A1 * | 12/2020 | Xin .................. H04W 74/0808 |

* cited by examiner

FILE REPAIR METHOD AND FILE REPAIR DEVICE FOR USER EQUIPMENT

CROSS-REFERENCE TO RELATED APPLICATION

This U.S. non-provisional application claims priority under 35 U.S.C. § 119 to Chinese Patent Application No. 202111570594.6 filed Dec. 21, 2021, the disclosure of which is incorporated by reference herein in its entirety.

TECHNICAL FIELD

Embodiments of the inventive concept generally relate to multimedia broadcast and multicast, and in particular, to a file repair method and a file repair device for a user equipment (UE).

DISCUSSION OF RELATED ART

Multimedia Broadcast/Multicast Service (MBMS) is an important characteristic introduced by the 3GPP (3rd Generation Partnership Project) organization in the R6 version. It is a point-to-multipoint service for achieving simultaneous transmission of data from a data source to multiple User Equipments (UEs) within a specific range, and provides multimedia services to a large number of UEs with the same needs with fewer resources at the same time, thus sharing network (including core network and access network) resources. Evolved Multimedia Broadcast/Multicast Service (eMBMS) is an evolution of MBMS in Long Term Evolution (LTE).

MBMS transmission methods are mainly divided into four categories: File Download Transmission (FDT), streaming media transmission, group communication transmission, and transparent transmission. To supplement or enhance transmission characteristics of eMBMS, Associated Delivery Procedure (ADP) is also designed in the protocol, and ADP includes file repair. The file repair refers to a supplementary strategy for repairing a file with lost fragments or damaged in FDT, which mainly includes unicast repair and multicast repair (multicast herein collectively refers to broadcast service and multicast service).

After an expiration time of a data transmission session is reached, a UE may trigger a file repair process if a file download fails. The file repair process includes the UE first determines whether a network side supports a unicast repair mechanism. If the network side supports the unicast repair mechanism, it may monitor an In-band message to determine whether to trigger multicast repair before a Back-off Time expires. If the In-band message that triggers the multicast repair is not monitored after the Back-off Time expires, the UE may be triggered to transmit a file repair request to the network side to perform the unicast repair process. If the UE receives, from the network side, a Uniform Resource Identifier (URI) to redirect the multicast repair after transmitting the file repair request, the UE performs the multicast repair process.

In the above file repair process, when the network side supports the unicast repair mechanism, whether the UE performs the multicast repair depends on the monitored In-band message. Whether the network side will transmit the In-band message to trigger the UE to start the multicast repair may require a certain amount of judgment time, and the UE that transmits the file repair request may only adopt the unicast repair before the network side makes a decision. For example, the network side may decide to start the multicast repair based on the number of UEs transmitting repair requests for the same file exceeding a threshold. In this way, if the number of UEs transmitting the file repair requests has not reached the threshold after these UEs transmit the file repair requests to the network side, the network side will not trigger these UEs to enter the multicast repair process, and these UEs may only perform the unicast repair process first. If the number of UEs that trigger this file repair is enough so that the condition of the multicast repair is met, the network side may then decide to perform the multicast repair. Repairing the file in this way will cause a large amount of downlink data and waste of network resources.

SUMMARY

According to an embodiment of the inventive concept, a file repair method for a user equipment (UE) is provided. The UE receives a target file multicasted by a network side in a file download transmission (FDT) manner. The method includes transmitting, by the UE, a multicast attempt repair request for the target file to the network side in a first time period after determining that the target file needs to be repaired, where the first time period does not exceed a time period of a Back-off time of a current session, receiving, by the UE, a feedback message transmitted by the network side, where the feedback message instructs the UE to perform multicast repair, and performing, by the UE, the multicast repair on the target file in response to the received feedback message.

According to an embodiment of the inventive concept, a file repair method for a first UE is provided. The first UE receives a target file multicasted by a network side in a file download transmission (FDT) manner. The method includes receiving, by the network side, multicast attempt repair requests for the target file transmitted by UEs including the first UE, performing, by the network side, statistics on the received multicast attempt repair requests for the target file to determine whether to perform multicast repair on the target file before a second time period expires, where the second time period is less than a time period of a Back-off time of a current session, and transmitting, by the network side, a feedback message to the UEs in a multicast area if it is determined to perform the multicast repair on the target file, where the feedback message instructs the first UE to perform the multicast repair on the target file.

According to an embodiment of the inventive concept, a file repair device for a user equipment (UE) is provided. The UE receives a target file multicasted by a network side in a file download transmission (FDT) manner. The device includes a requesting circuit configured to transmit a multicast attempt repair request for the target file to the network side in a first time period after determining that the target file needs to be repaired, where the first time period does not exceed a time period of a Back-off time of a current session, a receiving circuit configured to receive a feedback message transmitted by the network side, where the feedback message instructs the UE to perform multicast repair, and a repairing circuit configured to perform the multicast repair on the target file in response to the received feedback message.

According to an embodiment of the inventive concept, a file repair device for a first UE is provided. The first UE receives a target file multicasted by a network side in a file download transmission (FDT) manner. The device includes a receiving circuit configured to receive multicast attempt repair requests for the target file transmitted by UEs including the first UE, a decision circuit configured to perform statistics on the received multicast attempt repair requests for the target file to determine whether to perform multicast repair on the target file before a second time period expires, where the second time period is less than a time period of a Back-off time of a current session, and a transmitting circuit configured to transmit a feedback message to the UEs in a multicast area if it is determined to perform the multicast repair on the target file, where the feedback message instructs the first UE to perform the multicast repair on the target file.

BRIEF DESCRIPTION OF THE DRAWINGS

The above and other features of the inventive concept will become more apparent by describing in detail embodiments thereof with reference to the accompanying drawings.

DETAILED DESCRIPTION OF THE EMBODIMENTS

Figure 1:
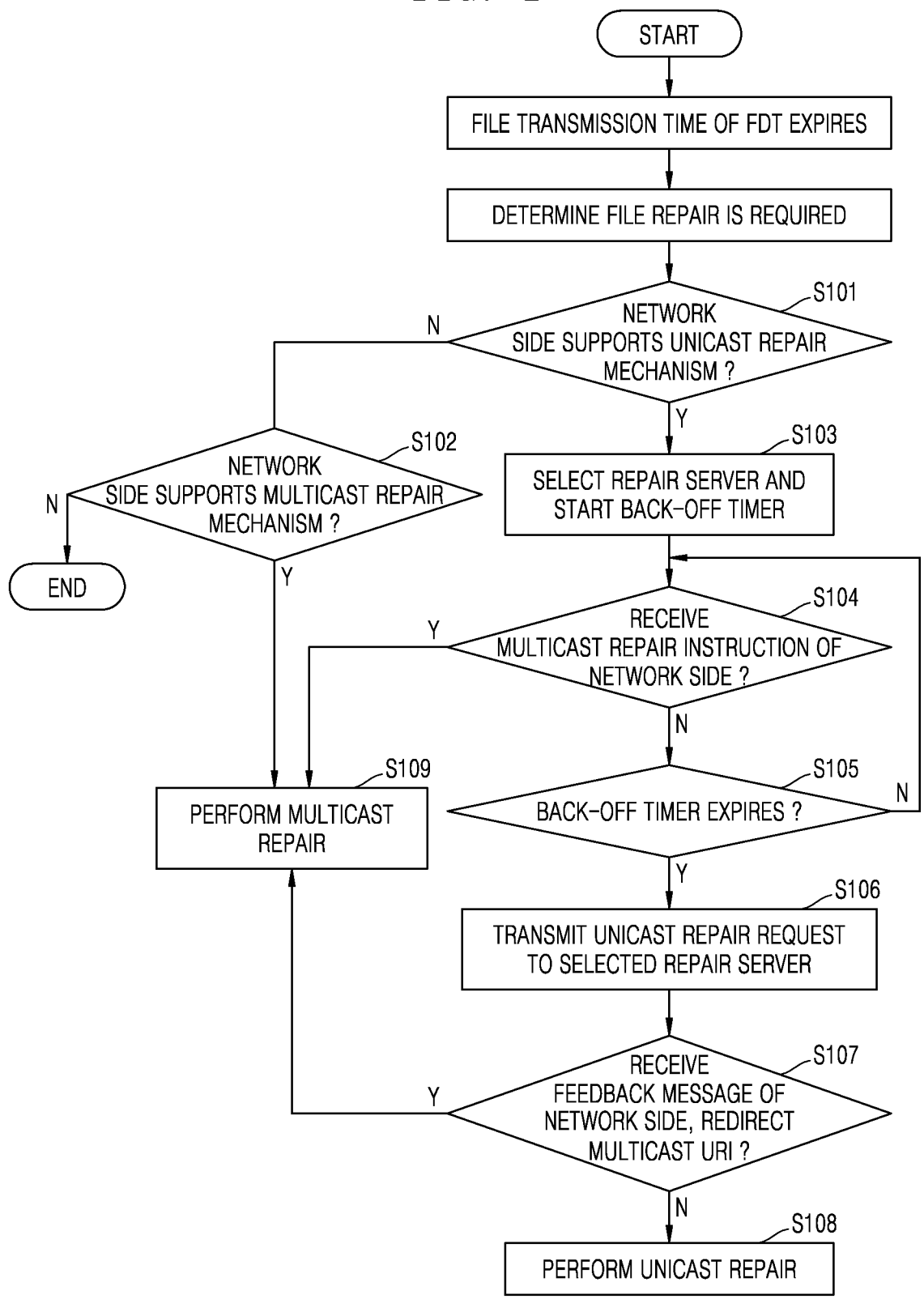
FIG. 1 shows a flowchart of a file download transmission (FDT) file transmission method in a multimedia broadcast/multicast service in prior art.

Embodiments of the inventive concept provide a file repair method and a file repair device for a user equipment (UE), which transmit a multicast attempt repair request for a target file to a network side in advance, so that the network side may collect the repair request for the target file from the UE in advance, and then may quickly decide whether to perform multicast repair. Especially in the case that the multicast repair is required, the multicast repair is performed on the target file first, which may reduce downlink unicast traffic, reduce dependence on a large number of file repair servers, and greatly reduce consumption of bandwidth and software and hardware resources.

Embodiments of the inventive concept will be described more fully hereinafter with reference to the accompanying drawings. Like reference numerals may refer to like elements throughout this application.

FIG. 1 shows a flowchart of a file download transmission (FDT) file transmission method in a multimedia broadcast/multicast service in prior art.

As shown in FIG. 1, in prior art, after an expiration time of a data transmission session of FDT in multimedia broadcast/multicast service (MBMS) is reached, a session time of MBMS expires, a schedule time of a file expires, or a UE fails to download a target file, a repair process of the target file may be triggered. The repair process includes:

Operation S101: The UE determines whether a network side supports a unicast repair mechanism.

The UE receives a broadcast message transmitted by the network side, and the broadcast message carries information indicating whether the network side supports unicast repair or multicast repair.

Operation S102: If the UE determines that the network side does not support the unicast repair mechanism, it continues to determine whether the network side supports a multicast repair mechanism. If the network side supports the multicast repair mechanism (S102: Y), the repair process skips to operation S109 to perform the multicast repair; otherwise (S102: N), the repair process ends.

Operation S103: If the UE determines that the network side supports the unicast repair mechanism, the UE selects a server address for the unicast repair from a file repair server list of Associated Delivery Procedure (ADP), and starts a Back-off timer.

Operation S104: Before the Back-off timer expires, the UE monitors an In-band message transmitted by the network side to determine whether to trigger the multicast repair; if the UE receives the In-band message that triggers the multicast repair (S104: Y), the repair process skips to S109 to perform the multicast repair.

Operation S105: If the UE does not receive the In-band message that triggers the multicast repair (S104: N), the UE determines whether the Back-off timer expires. If the Back-off timer does not expire (S105: N), the repair process returns to operation S104 to continue monitoring; if the Back-off timer expires (S105: Y), the repair process performs operation S106.

Operation S106: The UE transmits a unicast repair request to the network side, where the unicast repair request carries the server address for the unicast repair selected by the UE, basic information of the target file, and lost information of the target file.

Operation S107: The UE receives a feedback message transmitted by the network side, and determines whether a multicast Uniform Resource Identifier (URI) is redirected, and if so (S107: Y), the repair process skips to operation S109 to perform the multicast repair.

Operation S108: If the multicast URI is not redirected (S107: N), the unicast repair is performed.

For the unicast repair in the present embodiment, the UE receives a unicast repair message transmitted by the network side.

If the unicast repair message carries unicast repair data, the UE repairs the target file according to the unicast repair data, and the unicast repair process ends with a successful repair.

If the unicast repair message indicates that the server address carried in the unicast repair request is not available, the UE selects a new server address from the server list of the ADP again.

The UE re-transmits a new unicast repair request to the network side. The new unicast repair request carries the new server address. If the repair data is successfully received from the network side, the process ends; otherwise, the UE continues to select a new server address, until all server addresses in the server list of the ADP are tried.

Operation S109: The UE performs the multicast repair.

For example, the UE opens a new multicast session, or receives the repair data by using the original session to complete the multicast repair.

In view of the above process, in the case that the multicast repair is required, and before the network side makes a decision for the multicast repair, the UE that transmits the unicast repair request first needs to perform the unicast repair to obtain the repair data from the network side. After the network side makes the decision for the multicast repair, the network side transmits the multicast repair data again, which causes a waste of network resources.

Based on the above problems, the inventive concept proposes a file repair method for the UE. First, a file repair request (a multicast attempt repair request) transmitted by the UE to the network side is advanced to the Back-off time, and the network side makes a statistical decision on received file repair requests before the Back-off time, prioritizes whether to perform the multicast repair, and if a multicast repair condition is met, directly transmits a feedback message to these UEs, instructing these UEs to perform the multicast repair on the target file. In other words, in embodiments of the inventive concept, when the multicast repair condition is met, the multicast repair is performed first, which eliminates the need for the unicast repair of some UEs and reduces the waste of network resources.

Figure 2:
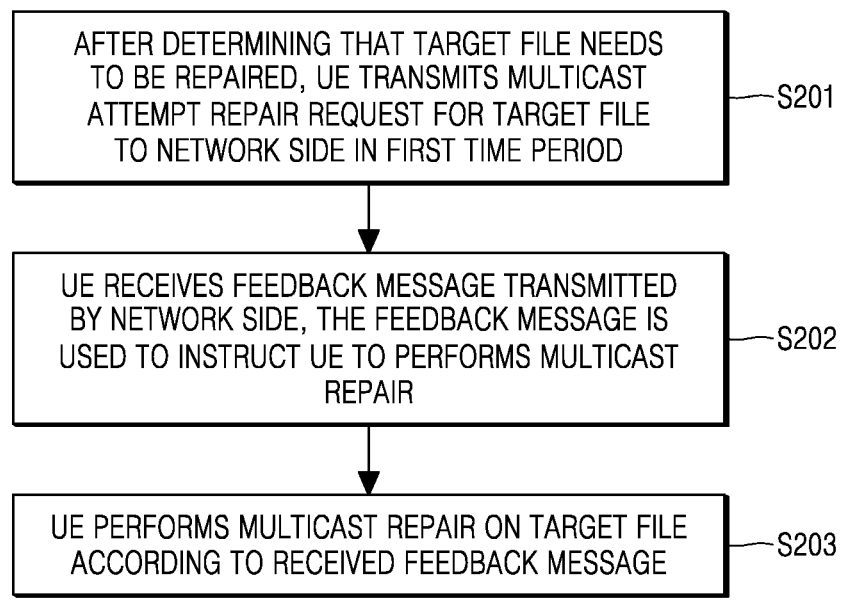
FIG. 2 shows a flowchart of a file repair method on a user equipment (UE) side according to an embodiment of the inventive concept.

FIG. 2 shows a flowchart of a file repair method on a user equipment (UE) side according to an embodiment of the inventive concept. The UE receives a target file multicasted by a network side in a file download transmission (FDT) manner, and the file repair method specifically includes:

Operation S201: After determining that the target file needs to be repaired, the UE transmits a multicast attempt repair request for the target file to the network side in a first time period.

It may be understood that the target file usually refers to a multimedia service involved in a Multimedia Broadcast/Multicast Service (MBMS) service, and multicast repair may be understood as repairing in a broadcast or multicast way (Broadcast/Multicast Repair).

Herein, the multicast attempt repair request carries basic information and lost information of the target file. The basic information of the target file includes a name of the target file or an ID of the target file, and the lost information of the target file may include range information of symbols lost by the UE.

Herein, the first time period does not exceed a time period of a Back-off time.

In the existing technical solution, when the Back-off time expires, if the UE has not received an instruction of the network side to perform the multicast repair, the UE transmits a unicast repair request for the target file to the network side. On the other hand, in embodiments of the inventive concept, the multicast attempt repair request for the target file is transmitted to the network side in advance, so that the network side may collect a repair request for the target file from the UE in advance, and then may quickly decide whether to perform the multicast repair, especially in the case that the multicast repair is required. As such, the multicast repair is performed on the target file first.

Preferably, the first time period does not exceed the time period of an Offset time.

To ensure timeliness of repairing the target file, the multicast attempt repair request may be set to be transmitted before the Offset time, so as to ensure that the UE may still perform the unicast repair in time after the network side makes a unicast repair decision.

For example, to avoid instantaneous uplink request load to the network, each UE may calculate a random value Random Attempt Time according to the Offset time to ensure that attempt requests of UEs in a multicast area are distributed as evenly as possible in an entire interval of the Offset Time. Each UE may transmit the multicast attempt repair request to the network side through an HTTP request when this Random Attempt Time is reached. To be backward compatible with the file unicast repair solution of the R14 version of eMBMS 26.346, the request may carry an attempt flag bit (where 0 is an original repair request and 1 is an attempt request). The attempt flag bit is 1 for inquiring the network side whether to perform the multicast repair on the target file.

Operation S202: The UE receives a feedback message transmitted by the network side, where the feedback message is used to instruct the UE to perform the multicast repair.

According to the received multicast attempt repair requests, the network side decides whether to perform the multicast repair after statistical analysis, and transmits a result back to the UE through an HTTP response (e.g., the feedback message) or In-band transmission.

If the network side decides not to perform the multicast repair according to the received multicast attempt repair requests after the statistical analysis, the UE may receive a first feedback message transmitted by the network side, and the first feedback message is used to instruct the UE to wait for a multicast decision instruction from the network side. By configuring the first feedback message, it is possible to wait before the decision of the multicast repair has not been made instead of directly performing the unicast repair, thus performing the multicast repair first and reducing downlink unicast traffic.

The feedback message received by the UE from the network side instructs the UE to perform the multicast repair. To minimize an overhead of downlink network transmission, the feedback message may only feed back a flag bit to indicate a manner in which the UE performs the target file repair.

For example, the flag bit may include a File Download Transmission (FDT) update flag instructing the UE to receive multicasted repair data based on a current download session.

In addition, the flag bit may also include a session description protocol (SDP) update flag instructing the UE to receive multicasted repair data in a new session.

For example, the flag bit "multi Flag" may be defined in the HTTP response as follows:
   000 indicates to use a default repair process and continue to observe In-band ADP updates;
   001 indicates to perform the multicast repair in a current session and pay attention to receiving information by using FDT updates;
   002 indicates to perform the multicast repair in the current session and return an FDT message URL or FDT message;
   003 indicates to receive data in a new file repair session and pay attention to In-band SDP updates; and
   004 indicates to receive data in a whole new file repair session and return an SDP message URL or SDP message.

Operation S203: The UE performs the multicast repair on the target file according to the received feedback message.

Before expiration of the Back-off time, if the multi Flag carried in the received first feedback message is 000, the UE continues to wait; after the expiration of the Back-off time, if the UE has not received the feedback message from the network side, operations S106-S109 shown in FIG. 1 are performed.

If the received feedback message indicates multicast repair, for example, if the multi Flag is any one of 001-004, the multicast repair is started and performed in the manner indicated by the multi Flag.

For example, if the multi Flag is 001, the UE updates relevant parameters (such as Offset time) of the current session according to the FDT information received in the band, and uses the updated current session to perform the multicast repair. If the multi Flag is 002, the UE uses HTTP to receive the FDT message URL or FDT message, updates the relevant parameters of the current session according to the FDT message or by using the FDT message URL to unicast request the FDT message, and uses the updated current session to perform the multicast repair. If the multi Flag is 003, the UE obtains the repair session information through the In-band SDP message, establishes a new file repair session with the network side based on the obtained repair session information, and prepares to receive the multicast repair data packet transmitted by the network side. If the multi Flag is 004, the UE may receive the SDP message URL or SDP message. If the SDP URL is received, the UE unicast requests the network side to transmit the SDP message according to the SDP URL, and then the UE uses the SDP message information to establish a new file repair session with the network side, prepares to receive the repair data packets multicasted by the network side, and performs Forward Error Correction (FEC) repair when the UE receives enough symbols.

If the multicast repair of the target file fails, the UE performs the unicast repair of the target file, and performs operations S106-S109 described above. By performing the unicast repair after the multicast repair fails, it is possible to focus on the multicast repair and supplement by the unicast repair to ensure a final file repair success rate, which has better compatibility and robustness.

Figure 3:
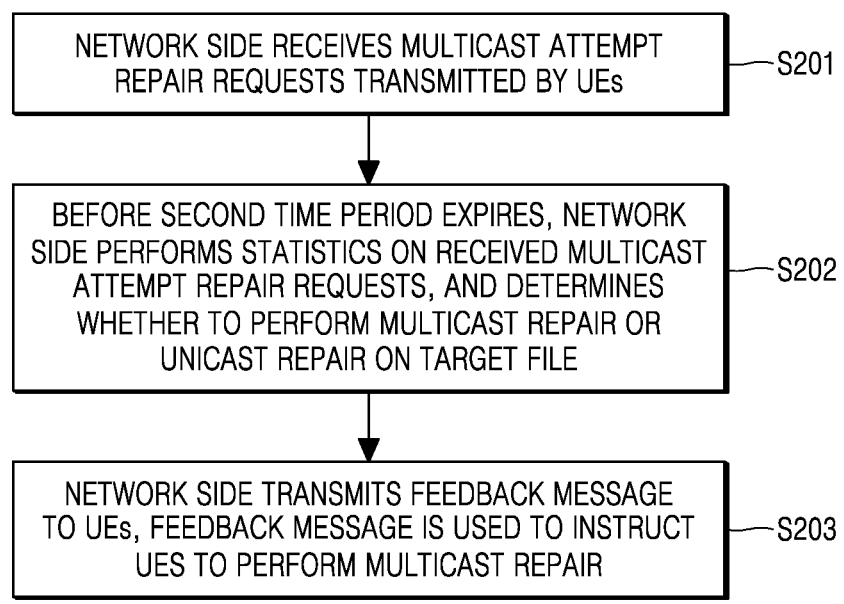
FIG. 3 shows a flowchart of a file repair method on a network side according to an embodiment of the inventive concept.

FIG. 3 shows a flowchart of a file repair method on a network side according to an embodiment of the inventive concept. This embodiment is performed by the network side, which may be understood as Broadcast Multicast Service Center (BM-SC), which is located in a core network and used to provide and manage multimedia broadcast/multicast services (MBMS). The method includes:

Operation S301: The network side receives multicast attempt repair requests transmitted by UEs.

Operation S302: Before a second time period expires, the network side performs statistics on the received multicast attempt repair requests, and determines whether to perform multicast repair or unicast repair on a target file.

Operation S303: The network side transmits a feedback message to the UEs, where the feedback message is used to instruct the UEs to perform the multicast repair.

The second time period is a time period during which the network side makes a decision and transmits the feedback message, and is a time period of an Offset time of a current session plus a preset time period. For example, it may range from the Offset Time to the Offset Time+Multicast Repair Offset Time. The Multicast Repair Offset Time is used as a buffer time for the network side feeding back the multicast repair decision.

For example, the UE side has a slight delay compared with the Back-off Time in prior art, e.g., Back off Time=the Offset Time+the Multicast Repair Offset Time+Random Time Period.

For example, the network side may use whether the number of UEs that have transmitted the multicast attempt repair requests reaches a threshold as a judgment condition for starting the multicast repair. If the number of UEs transmitting the multicast attempt repair requests reaches the threshold, the multicast repair is determined.

The condition of whether the number of UEs reaches the threshold is simple and effective, but it is more sensitive to the number of UEs, and the setting of the threshold has a greater impact on making the decision. Based on this, the network side may also predict whether to start the multicast repair through a machine learning multi-classification model, which helps to reduce an influence of parameters, such as the threshold, on making the decision and to optimize a method for making the decision on the network side.

For example, in operation S302, after the network side determines to perform the multicast repair on the target file, it may also determine a multicast repair strategy for the target file. The multicast repair strategy includes multicast repair data and a multicast repair method.

Herein, the multicast attempt repair request includes lost information of the target file; the lost information is different for different UEs. The network side, based on the multicast attempt repair requests received from multiple UEs, performs statistics on the lost information carried in the multicast attempt repair requests, so as to determine multicast repair information. For example, the multicast repair information may be range information of source symbols (original symbols of the target file) that need to be repaired.

According to an embodiment of the inventive concept, the network side may statistically analyze range information of all symbols lost by UEs transmitting the multicast attempt repair requests during a current request time period, and determine a range of all symbols lost by the UEs as the multicast repair information, namely a largest UE supported repair mode. This method is suitable for scenarios where the lost form of the different UEs is uniform.

According to an embodiment of the inventive concept, the network side may statistically analyze a range of a predetermined ratio of all symbols lost by UEs transmitting the attempt requests during the current request time period, e.g., the multicast repair information may be symbols covering the predetermined ratio of all symbols lost by the multiple UEs, namely an optimal UE coverage mode. For example, the predetermined ratio may be 80%. This method is suitable for scenarios where the loss form is a normal distribution.

In this way, by combining with a selection of the predetermined ratio, a reasonable repair range may be controlled, and then the amount of multicast repair data may be controlled. It can be understood that the larger the predetermined ratio is, the larger the repair range is, and the higher the repair success rate is; furthermore, the larger the predetermined ratio is, the larger the amount of data is. In a specific application, it may be combined with the distribution of the lost data to determine which predetermined ratio is used to perform statistics on the lost symbols.

As an example, the network side may predict the multicast repair information through a machine learning multi-classification model. The module for determining whether to perform the multicast repair and the module for determining the multicast repair information may be completed together through one machine learning multi-classification model. An input of the machine learning multi-classification model may be feature values extracted from multicast attempt repair requests received from the network side, such as an average number of the lost symbols for each UE, the number of UEs transmitting the multicast attempt repair requests, a mean value of the symbol loss distribution set of all UEs, etc., and an output may be the multicast repair information.

For example, Table 1 is a statistical table of the lost symbols of all UEs that have transmitted the multicast attempt repair requests in a multicast area within a request interval. Symbol 0-Symbol n represent numbers of the symbols in a Block, and UE 0-UE n represent the UEs that transmit the multicast attempt repair requests within the request interval. Among them, 1 indicates that the symbol of the corresponding number is lost, and 0 indicates that the symbol of the corresponding number has been received.

TABLE 1

| UE\Symbol | Symbol 0 | Symbol 1 | ... | Symbol n − 1 | Symbol n |
|---|---|---|---|---|---|
| UE 0 | 0 | 1 | | 1 | 0 |
| UE 1 | 1 | 0 | | 0 | 1 |
| ... | ... | ... | ... | ... | ... |
| UE n | 0 | 1 | | 1 | 1 |

First, the network side performs feature engineering on data carried in the received multicast attempt repair requests, and defines 6 Features and 3 Labels.

Feature 0: the number of UEs transmitting multicast attempt repair requests. This feature reflects an occurrence of loss at the macro level.

Feature 1: the average number of the lost symbols for each UE. This feature reflects severity of loss.

Feature 2: the mean value of the symbol loss distribution set of all UEs.

Feature 3: a variance of the symbol loss distribution set of all UEs.

Feature 4: a mean value of a set of the number of all UEs that have lost symbols.

Feature 5: a variance of the set of the number of all UEs that have lost symbols.

Label 0: do not perform multicast file repair.

Label 1: multicast repair—largest UE supported repair mode, e.g., the multicast repair information includes a range of all symbols lost by all UEs that transmit the multicast attempt repair requests.

Label 2: multicast repair—optimal UE coverage mode, e.g., the multicast repair information includes a range of a predetermined ratio of all symbols lost by all UEs that transmit the multicast attempt repair requests.

By using online data collection, clustering (such as K-means) is completed through a machine learning algorithm, and Labels are manually marked based on expert experience as an offline training data source. A machine learning method such as artificial neural network, support vector machine, decision tree, etc. may be used to train the machine learning multi-classification model. When training the model, a combination of binary classifiers may be used to implement the construction of a multi-classifier. First, samples are divided into two types: no multicast repair and multicast repair, and then the multicast repair information is divided into the largest UE supported repair mode and the optimal UE coverage mode.

Feature extraction is performed on the data in Table 1 to obtain Feature 1-Feature 5, and Feature 1-Feature 5 are input to the trained machine learning multi-classification model. The multi-classification model outputs any of Label 0, Label 1, or Label 2 according to Feature 1-Feature 5.

If the classification model outputs Label 1 or Label 2, the network side further needs to decide the method of the multicast repair, e.g., whether to repair by a simple repair data packet method or repair by a hybrid repair data packet method.

Among them, in the simple repair data packet method, the network side only multicasts repair symbols of the target file to UEs. The repair symbol is a symbol encoded by the Raptor algorithm. When the number of source symbols and repair symbols received by the UE slightly exceeds the original total number of source symbols, FEC repair may be performed through the Raptor algorithm.

In the hybrid repair data packet method, the network side multicasts source symbol and repair symbol corresponding to repair information to UEs.

For example, if the network side determines that most UEs only lose a small amount of data packets according to the range information of the symbols lost by each UE, the simple repair data packet method may be adopted. If the network side determines that multiple UEs have more packet loss in different ranges according to the range information of the symbols lost by each UE and the number of UEs that lost each symbol, etc., the hybrid repair data packet method may be adopted. It should be noted that the network side may set different strategies to determine which repair data packet method is to be adopted, which is not specifically limited in the inventive concept.

For example, if the network side determines to use the simple repair data packet method, it determines the repair symbols according to a multiple greater than a channel transmission packet loss rate, so that it can ensure that the UE receives enough symbols and then restores an original file through Forward Error Correction (FEC) repair. In this way, the amount of redundant data is small and the amount of data transmission can be reduced.

If the network side determines to adopt the hybrid repair data packet method, the network side multicasts the source symbol and the repair symbol corresponding to the repair information to the UEs. In other words, if the multicast repair information is all symbols lost by all UEs that transmit the multicast attempt repair requests, the data packet transmitted to the UEs by the network side includes all source symbols and repair symbols lost by all UEs that transmit the multicast attempt repair requests. If the multicast repair information includes the symbols of the predetermined ratio lost by all UEs that transmit the multicast attempt repair requests, the data packet transmitted to the UEs by the network side includes the source symbols and repair symbols of the predetermined ratio lost by all UEs that transmit the multicast attempt repair requests. This method not only retransmits original lost source symbols, but also transmits the repair symbols of the original lost data packet, so the transmission redundancy is relatively large, but the Raptor decoding success rate is higher and the speed is faster.

Figure 4:
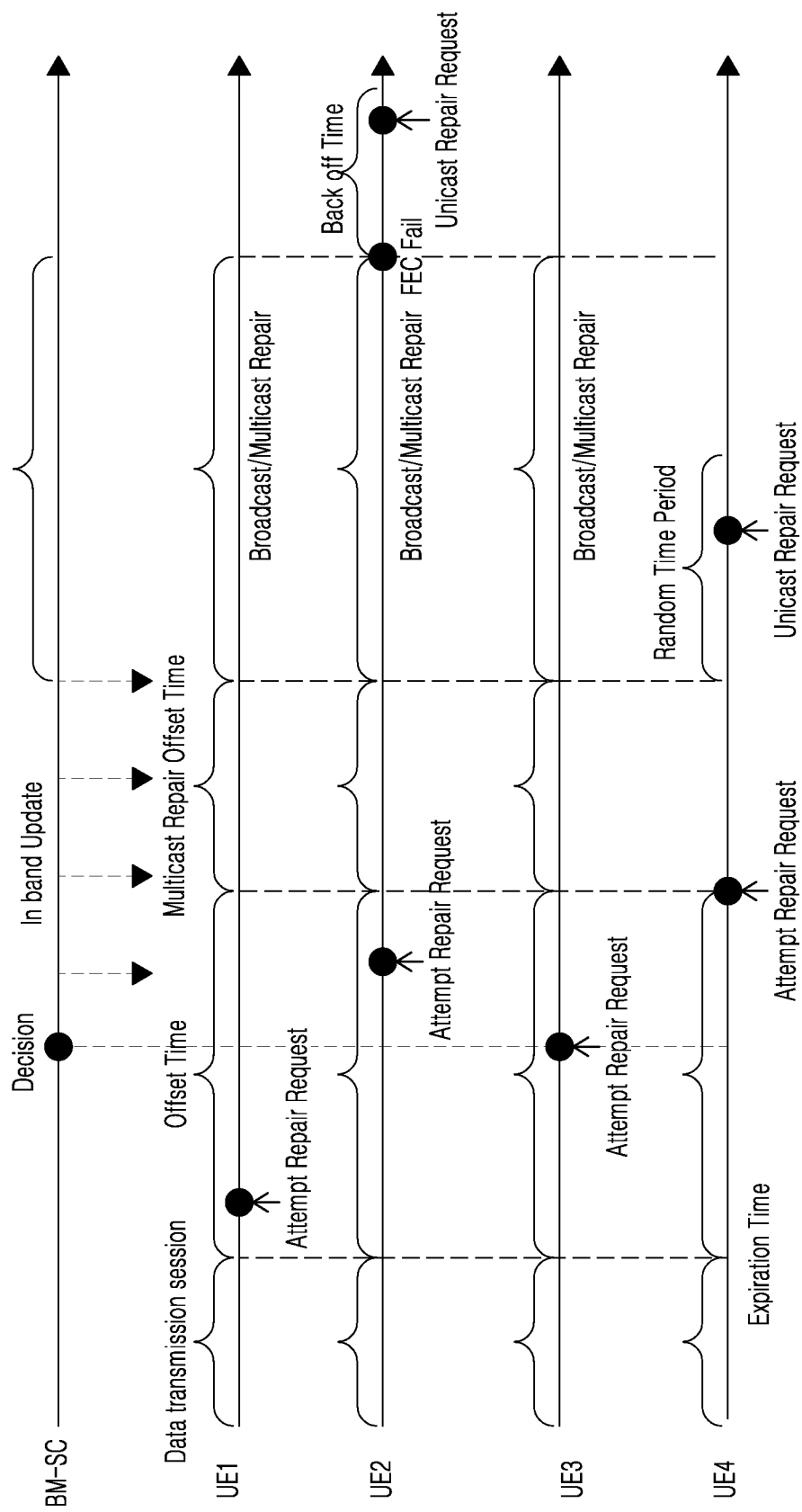
FIG. 4 shows a timing diagram of a file repair method of a UE according to an embodiment of the inventive concept.

FIG. 4 shows a timing diagram of a file repair method of a UE according to an embodiment of the inventive concept. FIG. 4 shows file repair by UEs and a network side, where the network side may be a BM-SC network element. The BM-SC network element multicast area includes UE1, UE2, UE3, and UE4.

After the BM-SC receives attempt requests of the UEs, it may perform statistics on the number of requests for each file. If a multicast repair threshold is not reached, a multicast repair flag is returned to the UEs as default (e.g., the first feedback message); on the other hand, if the multicast repair threshold is reached, the multicast repair flag is returned to the UEs as supported (e.g., the feedback message), and FDT or SDP may be selected to return at substantially the same time and multicast repair preparation is performed at substantially the same time. After making a multicast repair decision, the BM-SC may select the largest UE supported repair mode (e.g., take the largest symbol loss range or number in the UEs), or the optimal UE coverage mode (covering more than 90% of the UEs' loss range) according to statistical analysis of symbol ranges or numbers requested by the UEs during a current request time period. Then, it decides to select the simple repair data packet method or hybrid repair data packet method, as discussed above.

After UE1-UE4 transmit the multicast attempt repair requests, when the multicast repair flag is received as default, it may be necessary to keep waiting (such as UE1 in FIG. 4). Before the Multicast Repair Offset Time is reached, if an In-band FDT update or SDP update is received, the multicast file repair process is performed, like UE2 and UE3; otherwise, the process of operations S106-S109 is performed, like UE4. If in some extreme scenarios (such as the BM-SC transmitting data packets with the optimal UE coverage, the source symbols lost by the UEs are not transmitted, and not enough repair symbols are received to make up), after entering the multicast repair, Forward Error Correction (FEC) repair fails, it will switch to the processes of operations S106-S109, like UE2. Since the multicast repair has been entered previously, the original unicast repair has been cancelled, the unicast repair process needs to be restarted here, UE2 corresponds to the Back-off Time, and UE4 that directly enters the unicast repair process corresponds to the Random Time Period.

Figure 5:
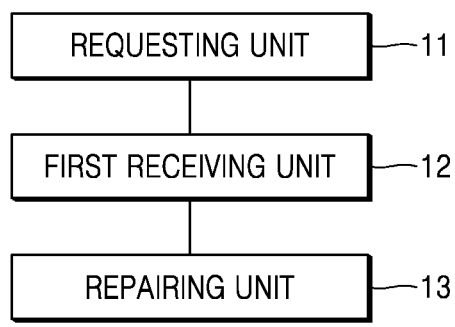
FIG. 5 shows a block diagram of a file repair device on a UE side according to an embodiment of the inventive concept.

FIG. 5 shows a block diagram of a file repair device on a user equipment (UE) side according to an embodiment of the inventive concept. The UE receives a target file multicasted by a network side in a file download transmission (FDT) manner. The device may include a requesting unit 11, a first receiving unit 12, and a repairing unit 13. According to an embodiment of the inventive concept, the requesting unit 11, the first receiving unit 12, and the repairing unit 13 may be circuits.

The requesting unit 11 is configured to transmit a multicast attempt repair request for the target file to the network side in a first time period after determining that the target file needs to be repaired, and the first time period does not exceed a time period of a Back-off time of a current session. The first receiving unit 12 is configured to receive a feedback message transmitted by the network side, and the feedback message is used to instruct the UE to perform multicast repair. The repairing unit 13 is configured to perform the multicast repair on the target file in response to the received feedback message.

Alternatively, the first time period may be a time period of an Offset time of the current session. This ensures that after the network side makes a unicast repair decision, the UE may still perform the unicast repair in time to ensure the timeliness of repairing the target file.

Alternatively, the multicast attempt repair request may carry an attempt flag bit used to inquire the network side whether to perform the multicast repair on the target file. By configuring the attempt flag bit, the multicast attempt repair request may be distinguished from an original repair request, and two repair solutions may be provided at the same time, so that the accessed network side makes the decision and selection, thus improving compatibility.

Alternatively, the feedback message may carry a flag bit instructing the UE to perform the multicast repair. The flag bit may include a FDT update flag instructing the UE to receive repair data of the target file multicasted by the network side based on the current session, or may include a session description protocol (SDP) update flag instructing the UE to receive repair data of the target file multicasted by the network side in a new session. By feeding back the flag bit, downlink network transmission overhead may be minimized. By configuring the FDT update flag or the SDP update flag, the UE may be clearly indicated how to receive the repair data.

Alternatively, the first receiving unit 12 may be further configured to: before receiving the feedback message transmitted by the network side, receive a first feedback message transmitted by the network side. The first feedback message is used to instruct the UE to wait for a multicast decision instruction from the network side.

Alternatively, the repairing unit 13 may be configured to: after performing the multicast repair on the target file according to the received feedback message, if the repair of the target file fails, perform unicast repair of the target file.

Figure 6:
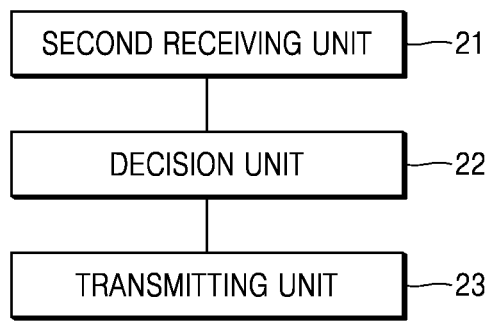
FIG. 6 shows a block diagram of a file repair device on a network side according to an embodiment of the inventive concept.

FIG. 6 shows a block diagram of a file repair device on a network side according to an embodiment of the inventive concept. The UE receives a target file multicasted by a network side in a file download transmission (FDT) manner. The device may include a second receiving unit 21, a decision unit 22, and a transmitting unit 23. According to an embodiment of the inventive concept, the second receiving unit 21, the decision unit 22, and the transmitting unit 23 may be circuits.

The second receiving unit 21 is configured to receive multicast attempt repair requests for the target file transmitted by UEs including the UE. The decision unit 22 is configured to perform statistics on the received multicast attempt repair requests for the target file to determine whether to perform multicast repair on the target file before a second time period expires, and the second time period is less than a time period of a Back-off time of a current session. The transmitting unit 23 is configured to transmit a feedback message to the UEs in a multicast area if it is determined to perform the multicast repair on the target file, and the feedback message is used to instruct the UE to perform the multicast repair on the target file.

Alternatively, the second time period may be a time period of an Offset time of the current session plus a preset time period. By adding the preset time period on the basis of an original Offset Time as the second time period, a buffer time may be reserved for the network side feeding back the multicast repair decision.

Alternatively, the multicast attempt repair request may carry an attempt flag bit used to inquire the network side whether to perform the multicast repair on the target file.

Alternatively, the feedback message may carry a flag bit instructing the UE to perform the multicast repair. The flag bit includes a FDT update flag instructing the UE to receive repair data of the target file multicasted by the network side based on the current session; or the flag bit includes a session description protocol (SDP) update flag instructing the UE to receive repair data of the target file multicasted by the network side in a new session.

Alternatively, the transmitting unit 23 may be further configured to: before the second time period expires, and if it is determined not to perform the multicast repair on the target file, transmit a first feedback message to the UEs in the multicast area. The first feedback message is used to instruct the UE to wait for a multicast decision instruction from the network side. By configuring the first feedback message, it is possible to wait before the decision of multicast repair has not been made instead of directly performing the unicast repair, thus performing the multicast repair first and reducing downlink unicast traffic. After the second time period expires, if the feedback message for the multicast repair is still not received, the original repair process may be entered and the unicast repair is performed, achieving smooth unicast and multicast repair switching and ensuring a final file repair success rate, which has better compatibility and robustness.

Alternatively, the multicast attempt repair request may further carry target file information lost by the UE.

Figure 7:
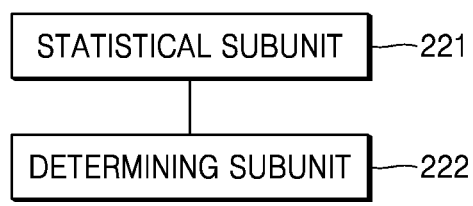
FIG. 7 shows a block diagram of a decision unit according to an embodiment of the inventive concept.

FIG. 7 shows a block diagram of a decision unit according to an embodiment of the inventive concept. The decision unit 22 of FIG. 6 may include a statistical subunit 221 and a determining subunit 222. The statistical subunit 221 is configured to perform statistics on the lost target file information in the received multicast attempt repair requests to generate statistics results if it is determined to perform the multicast repair on the target file, before the second time period expires. The determining subunit 222 is configured to determine multicast repair information based on the statistics result. By determining reasonable repair information for the multicast repair according to the statistics result of the lost target file information, it is possible to reduce the amount of repair data transmitted while meeting the repair requirements as much as possible, thus reducing the amount of downlink data. According to an embodiment of the inventive concept, the statistical subunit 221 and the determining subunit 222 may be circuits.

Alternatively, the determining subunit 222 may be configured to determine range information of all symbols lost by the UEs that transmit the multicast attempt repair requests in a current request time period as the multicast repair information, which is suitable for a scenario where the loss form of different UEs is uniform; or the determining subunit 222 may be configured to determine range information of a predetermined ratio of all symbols lost by the UEs that transmit the multicast attempt repair requests in a current request time period as the multicast repair information, which is suitable for a scenario where the loss form of different UEs is a normal distribution. This solution satisfies the repair needs of different lost form scenarios.

The file repair method of the user equipment (UE) according to embodiments of the inventive concept may be written as a computer program and stored on a computer readable storage medium. When the computer program is executed by a processor, the file repair method of the user equipment (UE) described above may be implemented.

Examples of computer-readable storage media include: Read Only Memory (ROM), Random Access Programmable Read Only Memory (RAPROM), Electrically Erasable Programmable Read Only Memory (EEPROM), Random Access Memory (RAM), Dynamic Random Access Memory (DRAM), Static Random Access Memory (SRAM), flash memory, non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blu-ray or optical disk storage, Hard Disk Drive (HDD), Solid State Drive (SSD), card storage (such as multimedia cards, secure digital (SD) cards, or extremely fast digital (xD) cards), magnetic tapes, floppy disks, magneto-optical data storage devices, optical data storage devices, hard disks, solid state disks, or any other devices that are configured to store computer programs and any associated data, data files, and data structures in a non-transitory manner, and provide the computer programs and any associated data, data files, and data structures to a processor or computer so that the processor or computer can execute the computer programs. In one example, the computer programs and any associated data, data files, and data structures are distributed on a networked computer system, so that the computer programs and any associated data, data files, and data structures are stored, accessed, and executed through one or more processors or computers in a distributed manner.

The file repair method of the user equipment (UE) according to embodiments of the inventive concept may be implemented in the user equipment. For example, the user equipment may include: at least one processor and at least one memory, where the at least one memory stores computer executable instructions, and the computer-executable instructions, when executed by the at least one processor, implement the file repair method of the user equipment (UE) described in the above embodiments of the inventive concept.

The file repair method of the UE according to embodiments of the inventive concept may be implemented in a network side device. For example, the network side device may include: at least one processor and at least one memory, where the at least one memory stores computer-executable instructions, and the computer executable instructions, when executed by the at least one processor, implement the file repair method of the UE described in the above embodiments of the inventive concept.

The file repair method of the UE according to embodiments of the inventive concept combines characteristics and advantages of Raptor itself, and proposes a file repair solution mainly based on multicast repair. Through a designed signaling transmission strategy and a multicast decision model based on machine learning, inefficiency and incomplete repair problems in the existing unicast-first repair scheme may be reduced or eliminated. The embodiments of the inventive concept are backward compatible with the file unicast repair solution of the R14 version of eMBMS 26.346, and support smooth switching of unicast and multicast repair. In the multicast repair solution, unicast repair is taken as a supplementary solution under special conditions, so that network bandwidth resources are greatly saved while repair capacity is guaranteed.

As described above, the file repair method for the UE according to embodiments of the inventive concept transmits the multicast attempt repair request for the target file to the network side in advance, so that the network side may collect the repair request for the target file from the UE in advance, and then may quickly decide whether to perform multicast repair. Especially in the case that the multicast repair is required, the multicast repair is performed on the target file first. The embodiments of the inventive concept are also backward compatible with the original file repair strategy, e.g., when the network side decides that it is not necessary to enable the multicast repair, or when the multicast repair fails, the original repair process will be performed, and thus it is possible to focus on the multicast repair and supplement with the unicast repair. On one hand, smooth unicast and multicast repair switching may be achieved, which ensures a final file repair success rate and has better compatibility and robustness. On the other hand, most UEs may only make one uplink request, and only a minority of UEs in extreme cases will enter the unicast repair process, which may reduce downlink unicast traffic, reduce the dependence on a large number of file repair servers, and greatly reduce the consumption of bandwidth and software and hardware resources.

Although the inventive concept has been shown and described with reference to embodiments thereof, it will be understood by those of ordinary skill in the art that various modifications in form and details may be made thereto without departing from the spirit and scope of the inventive concept as set forth by the appended claims.

What is claimed is:

1. A file repair method for a user equipment (UE) configured to receive a target file multicasted by a network side in a file download transmission (FDT) manner, the method comprising:
   transmitting, by the UE, a multicast attempt repair request for the target file to the network side after determining that the target file needs to be repaired, wherein the multicast attempt repair request is transmitted during a Back-off time for a current session;

receiving, by the UE, a feedback message transmitted by the network side, wherein the feedback message instructs the UE to perform multicast repair and is received during the Back-off time for the current session; and performing, by the UE, the multicast repair on the target file in response to the received feedback message.

2. The method of claim 1, wherein the multicast attempt repair request is transmitted during an Offset time of the current session.

3. The method of claim 2, wherein the multicast attempt repair request carries an attempt flag bit to inquire the network side whether to perform the multicast repair on the target file.

4. The method of claim 1, wherein the feedback message carries a flag bit to instruct the UE to perform the multicast repair, the flag bit comprises a FDT update flag or session description protocol (SDP) update flag, the FDT update flag instructs the UE to receive repair data of the target file multicasted by the network side based on the current session, and the SDP update flag instructs the UE to receive repair data of the target file multicasted by the network side in a new session.

5. The method of claim 1, wherein before the UE receives the feedback message transmitted by the network side, the method further comprises:

receiving, by the UE, a first feedback message transmitted by the network side, wherein the first feedback message instructs the UE to wait for a multicast decision instruction from the network side.

6. The method of claim 1, wherein after the UE performs the multicast repair on the target file in response to the received feedback message, the method further comprises:

performing, by the UE, unicast repair of the target file if the multicast repair of the target file fails.

7. A file repair method for a first user equipment (UE) configured to receive a target file multicasted by a network side in a file download transmission (FDT) manner, the method comprising:

receiving, by the network side, multicast attempt repair requests for the target file transmitted by UEs including the first UE, wherein the multicast attempt repair requests are received during a Back-off time for a current session;

performing, by the network side, statistics on the received multicast attempt repair requests for the target file to determine whether to perform multicast repair on the target file before a second time period expires; and transmitting, by the network side, a feedback message to the UEs in a multicast area if it is determined to perform the multicast repair on the target file, wherein the feedback message instructs the first UE to perform the multicast repair on the target file and is transmitted during the Back-off time for the current session.

8. The method of claim 7, wherein the second time period is a time period of an Offset time of the current session plus a preset time period.

9. The method of claim 7, wherein the multicast attempt repair requests carry an attempt flag bit to inquire the network side whether to perform the multicast repair on the target file.

10. The method of claim 7, wherein the feedback message carries a flag bit to instruct the first UE to perform the multicast repair, the flag bit comprises a FDT update flag or a session description protocol (SDP) update flag, the FDT update flag instructs the first UE to receive repair data of the target file multicasted by the network side based on the current session, and the SDP update flag instructs the first UE to receive repair data of the target file multicasted by the network side in a new session.

11. The method of claim 7, wherein before the second time period expires, if the network side determines not to perform the multicast repair on the target file, the network side transmits a first feedback message to the UEs in the multicast area, and the first feedback message instructs the UEs to wait for a multicast decision instruction from the network side.

12. The method of claim 7, wherein the multicast attempt repair requests further carry target file information lost by the UEs, and before the second time period expires, if the network side determines to perform the multicast repair on the target file, the method further comprises:

performing statistics on the target file information in the received multicast attempt repair requests to generate a statistics result; and determining multicast repair information based on the statistics result.

13. The method of claim 12, wherein determining the multicast repair information based on the statistics result comprises:

determining range information of all symbols lost by the UEs that transmit the multicast attempt repair requests in a current request time period as the multicast repair information; or determining range information of a predetermined ratio of all symbols lost by the UEs that transmit the multicast attempt repair requests in the current request time period as the multicast repair information.

14. A file repair device for a user equipment (UE) configured to receive a target file multicasted by a network side in a file download transmission (FDT) manner, the device comprising:

a requesting circuit configured to transmit a multicast attempt repair request for the target file to the network side in a first time period after determining that the target file needs to be repaired and before an expiration of a Back-off timer, wherein the multicast attempt repair request is transmitted during a Back-off time for a current session;

a receiving circuit configured to receive a feedback message transmitted by the network side, wherein the feedback message instructs the UE to perform multicast repair and is received during the Back-off time for the current session; and a repairing circuit configured to perform the multicast repair on the target file in response to the received feedback message.

15. The device of claim 14, wherein the multicast attempt repair request is transmitted during an Offset time of the current session.

16. The device of claim 15, wherein the multicast attempt repair request carries an attempt flag bit to inquire the network side whether to perform the multicast repair on the target file.

17. The device of claim 14, wherein the feedback message carries a flag bit to instruct the UE to perform the multicast repair, the flag bit comprises a FDT update flag or a session description protocol (SDP) update flag, the FDT update flag instructs the UE to receive repair data of the target file multicasted by the network side based on the current session, and the SDP update flag instructs the UE to receive repair data of the target file multicasted by the network side in a new session.

18. The device of claim 14, wherein the receiving circuit is further configured to:

before receiving the feedback message transmitted by the network side, receive a first feedback message transmitted by the network side, wherein the first feedback message instructs the UE to wait for a multicast decision instruction from the network side.

19. The device of claim 14, wherein the repairing circuit is configured to:

after performing the multicast repair on the target file in response to the received feedback message and if the multicast repair of the target file fails, perform unicast repair of the target file.

* * * * *